US006484906B2

(12) United States Patent
Bonningue

(10) Patent No.: US 6,484,906 B2
(45) Date of Patent: Nov. 26, 2002

(54) APPARATUS AND METHOD FOR DOSING A PRODUCT

(75) Inventor: Philippe Bonningue, Paris (FR)

(73) Assignee: L'Oreal, Paris (FR)

( * ) Notice: Subject to any disclaimer, the term of this patent is extended or adjusted under 35 U.S.C. 154(b) by 0 days.

(21) Appl. No.: 09/860,597

(22) Filed: May 21, 2001

(65) Prior Publication Data

US 2002/0017536 A1 Feb. 14, 2002

(30) Foreign Application Priority Data

May 19, 2000 (FR) .............................. 00 06450

(51) Int. Cl.⁷ .............................................. B65D 37/00
(52) U.S. Cl. ....................... 222/207; 222/213; 222/365; 222/449; 222/344; 222/341; 222/389; 222/362; 222/252
(58) Field of Search ................................ 222/207, 212, 222/213, 386, 365, 361, 449, 344, 340, 336, 341, 389, 362, 252

(56) References Cited

U.S. PATENT DOCUMENTS

| | | |
|---|---|---|
| 2,904,227 A | 9/1959 | Graham |
| 3,338,475 A | 8/1967 | Englesson |
| 4,376,495 A | 3/1983 | Spatz |
| 4,941,598 A | 7/1990 | Lambelet, Jr. et al. |
| 5,037,007 A | 8/1991 | Deussen |
| 5,090,600 A | 2/1992 | Clark |
| 5,207,666 A | 5/1993 | Idriss et al. |
| 5,636,765 A | 6/1997 | DeJonge |
| 6,241,129 B1 * | 6/2001 | Bonningue et al. ......... 222/207 |

FOREIGN PATENT DOCUMENTS

| | | |
|---|---|---|
| EP | 0 995 976 | 4/2000 |
| FR | 2 578 806 | 9/1986 |
| WO | WO 92/10727 | 6/1992 |

OTHER PUBLICATIONS

Co-pending application No. 09/866,832; Attorney Docket No. 05725.0890–00000 Title: Apparatus and Method for Dispensing a Product Inventor(s): Philippe Bonningue U.S. Filing Date: May 30, 2001.
English language Derwent Abstract of EP 0 995 976, Apr. 26, 2000.
English language Derwent Abstract of FR 2 578 806, Sep. 19, 1986.

* cited by examiner

Primary Examiner—Lesley D. Morris
Assistant Examiner—Stephanie L. Willatt
(74) Attorney, Agent, or Firm—Finnegan, Henderson, Farabow, Garrett & Dunner, L.L.P.

(57) ABSTRACT

A dosing nozzle is intended to be fitted onto a container containing a product. The nozzle comprises a dosing cavity which can move between a first position and a second position in which it occupies a minimum volume, the cavity being delimited by first and second pistons capable of sliding inside a fixed body. The first piston is fixed to a closure member capable, selectively, of closing off/exposing at least one outlet of the dosing cavity. During a first phase of the movement of the dosing cavity, the first piston is driven by through the effect of the pressure of the product being exerted on the second piston and, during a second phase of the movement of the dosing cavity, the first piston is driven by the pressure of the product being exerted on the first piston, the second piston being immobilized in translation during this second phase.

62 Claims, 4 Drawing Sheets

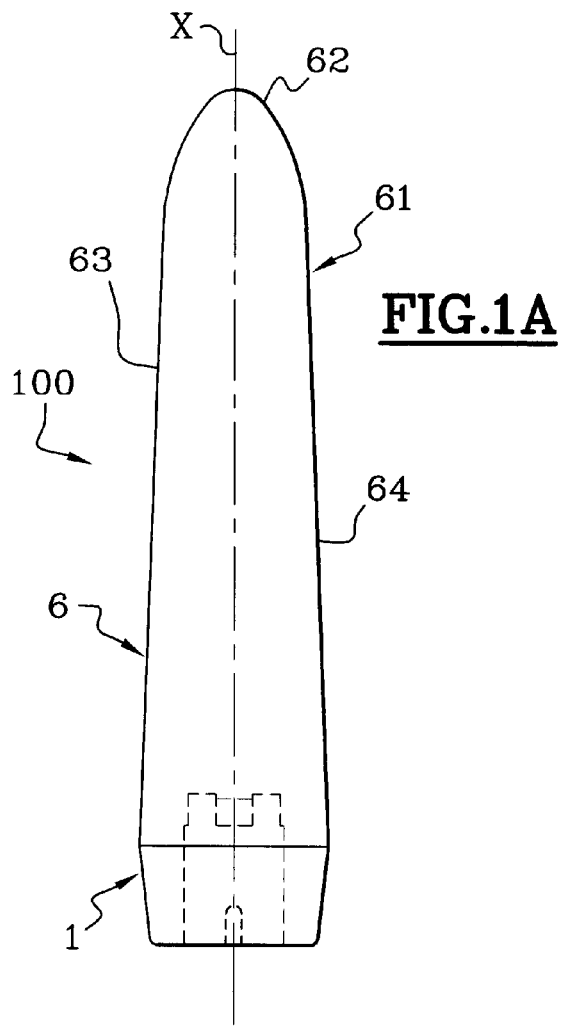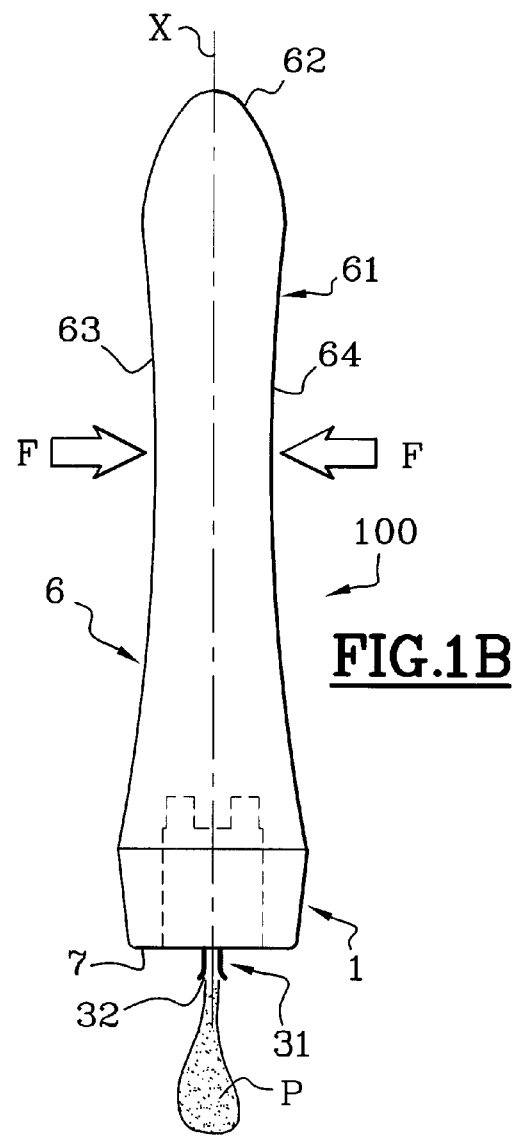

APPARATUS AND METHOD FOR DOSING A PRODUCT

Figure 2:
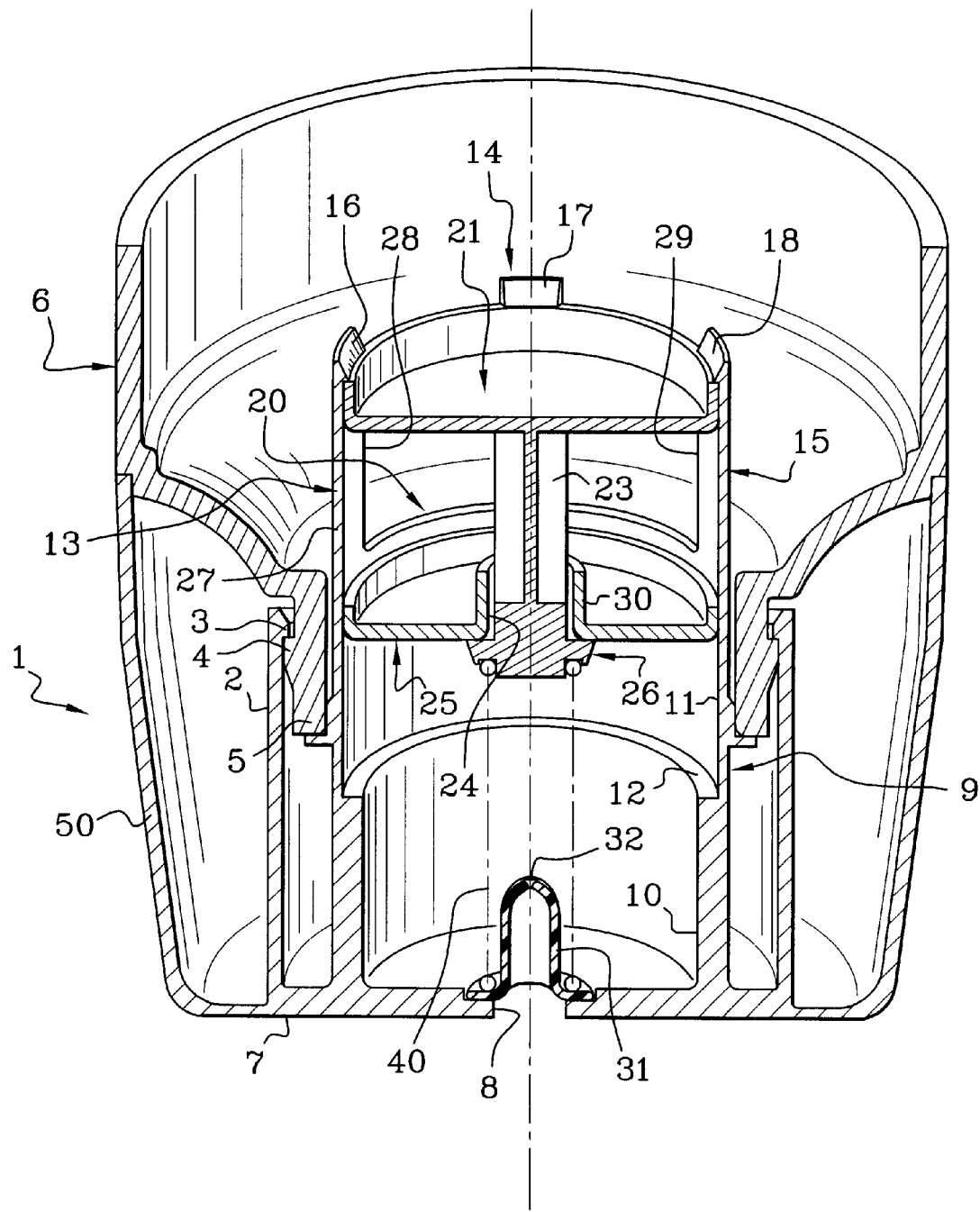

The present invention relates to an apparatus for dispensing doses of fluid product, such as, for example, doses of a predetermined volume of a cosmetic product such as a shampoo, a conditioner, a gel, a lotion, a milk, etc. The invention also relates to a device including the apparatus and a container. The invention further relates to a method of dosing a product.

In the cosmetics field, a good number of haircare products, particularly shampoos, are packaged in a container having deformable walls and a neck which is closed off by a wall having a center portion having one or more small holes for expulsion of the product. In order to dispense the product, the container is turned upside down. Pressure exerted on the deformable walls of the container allows the product to be forced out through the hole or holes. The product is collected in the user's palm and applied to his or her hair. However, this simple operation does not allow the amount of product dispensed to be dosed.

Of course, there are devices for dosing a product to be dispensed, but many of these devices have a complexity such that their cost is completely inconsistent with the economic requirements of certain distribution channels, in particular the mass market.

Some devices use a dosing arrangement of the type which includes a dosing chamber formed inside a movable member having a free end provided with openings capable of allowing dosed expulsion of the product. The openings in the dosing chamber are exposed by means of pressure exerted by the product on one face of the member. The product then flows under gravity when the openings are exposed. During expulsion of the product, the moveable member emerges substantially outside the dosing chamber. Such an arrangement is particularly appropriate for the dosed dispensing of very liquid products, such as drinks. On the other hand, such a system cannot easily be used for dispensing viscous products, such as those normally used especially in the cosmetics field. This is because the viscosity of these products does not allow the dose of product to flow sufficiently rapidly merely under the effect of its own weight.

Some other devices use a dosing arrangement comprising a dosing chamber inside which a piston is slideably fitted. An axial channel passes through a stem attached to the piston and terminates near the free end of the stem in a radial portion which emerges in an outlet. In the rest position, the outlet is closed off. In order to dispense a dose of product, the outlet is exposed due to the pressure of the product being exerted on the piston. The product flows through a radial portion of the channel, passes into the axial part of the channel and leaves through the radial outlet. Since the product necessarily passes through this axial channel made inside the stem, the device is particularly unsuitable for high flow rates, particularly in the case of products having a high viscosity. In addition, such an axial channel is subject to clogging, particularly when the product has not been used for a long period of time, possibly making the device completely unusable. Finally, localized dispensing of the product into the palm of the hand is one of the most difficult operations to carry out successfully.

Other configurations, such as that described in FR-A-2,578,806, include a second piston acting as a closure for an outlet. This configuration renders axial expulsion of the product difficult or even impossible.

Other dosing devices present a number of problems. Among these problems are, in particular, the relatively large number of parts, the complexity which results therefrom, the cost, the difficulty of use, problems of sealing, the problem of dispensing a precise dose, etc.

The invention optionally overcomes one or more limitations of the related art describe above. Certain aspects of the invention could be practiced without necessarily obviating one or more of these limitations.

A first optional aspect of the invention, includes a dosing nozzle, intended to be fitted onto a container containing a product, such as a cosmetic product, the nozzle including a dosing cavity in selective communication with the container via at least one inlet, the cavity being moveable between a first position and a second position in which it occupies a minimum volume; wherein the cavity is delimited partly by first and second pistons capable of sliding inside a fixed body; wherein the first position is fixed to a closure member which can move with respect to the second piston, and is capable, selectively, of closing off/exposing at least one outlet of the dosing cavity delimited at least partly by the second piston; wherein, during a first phase of the movement of the dosing cavity, the first piston is entrained by the second piston through the effect of the pressure of the product being exerted on the second piston and, during a second phase of the movement of the dosing cavity, is entrained by the pressure of the product being exerted on the first piston; and wherein the second piston is immobilized in translation during this second phase.

In certain optional embodiments of the invention, the first piston may be fixed relative to the closure member in at least one direction such as the axial direction. The first piston could be a single piece with the closure member, especially one obtained by molding.

Optionally, the dosing nozzle could be economical to produce. The nozzle may be simple and reliable to use and may be used for high-viscosity products. The product may be dosed in a relatively precise manner and it may be dispensed in a very localized manner into the palm of the hand.

In some optional embodiments, the degree of sealing between the peripheral edges of the first and second pistons and the inner surface of the body of the dosing nozzle depends to a large extent on the viscosity of the product, on the degree of inertia of the system which is deemed to be acceptable, and on the comfort sought when dispensing. For example, the nozzle could be configured so that when the product contains a great deal of liquid, there is a tight contact between the peripheral edges and the inner surface.

Optionally, the at least one expulsion passage is defined between a linking element at the end of which the closure member is formed, and an opening formed in the second piston. By modifying the number of passages and their size, it may be possible to a large extent to alter the expulsion flow rate of the product. In the case of a closure element whose cross section is in the form of a cross, four flow passages may be defined for the product. This flexibility in the configuration of the at least one expulsion passage may allow the dispensing of products having a viscosity chosen from the series ranging from very liquid products to very viscous products, such as shampoos or gels.

Optionally, the nozzle may employ a limited number of parts whose production, for example by moulding, does not involve the use of complicated, expensive moulds. For a shampoo, the volume of the dosing chamber may be on the order of about 5 ml., for example.

The container may have deformable lateral walls. The pressure of the product on the second piston, then on the first, may be obtained by pressure exerted on the walls.

There may be means allowing an intake of air into the container when the pressure on the walls ceases, in such a manner as to offset the reduction in the product volume inside the container after a dose of product has been dispensed. This configuration optionally may allow dispensing actuation by hand movements similar to hand movements conventionally employed, in particular in the field of cosmetics.

According to another embodiment, the at least one inlet of the dosing cavity may be delimited at least partly by the first piston. The dosing cavity may be in communication with the container during the first phase of the movement of the dosing cavity and isolated from the container during the second phase. The outlet or outlets may be closed during the first phase of the movement and open during the second.

With such a configuration, and by virtue of the axial height of the inlet or inlets, the dosing cavity optionally communicates with the container throughout the first phase of the movement of the dosing cavity. Such communication, on the one hand, may allow the progression of the second piston in the body of the dosing cavity and, on the other hand, may allow complete filling or "force-feeding" of the dosing cavity. The dosing cavity may be arranged so that the at least one outlet of the dosing cavity is closed off during this first phase. In one optional embodiment, the first phase of the movement is continued until the second piston is immobilized axially, which immobilization substantially coincides with the interruption of communication between the container and the dosing cavity. At this point, the pressure may be exerted solely on the first piston integral with the closure member, which then exposes the outlet of the dosing cavity. Due to the pressure of the first piston, the product may then be expelled from the dosing cavity.

According to another optional embodiment, the dosing cavity may be arranged in an annular manner right around a linking member having an end fixed to the closure member. The linking member may be centered on the axis X of the dosing cavity. The cavity may have a circular cross section, but any other cross section shape may nevertheless be used. Similarly, it is possible to provide for the closure element and the linking member not to be centered on the axis of the dosing chamber.

The dosing nozzle may comprise means capable of allowing fixing of the nozzle onto a neck formed by the container, for example by glueing, snap-fitting or screwing. Fitting may also be the result of force-fitting inside the neck of the container. The dosing nozzle is optionally formed by moulding of a thermoplastic material, such as a material chosen from polypropylenes or polyethylenes.

In some optional embodiments, the closure member and the first and second pistons are designed in such a manner that, when the dosing cavity returns from the second position to the first position, the first piston entrains the second piston. The closure member may be integral with the first piston and may be formed at the free end of a linking element traversing the second piston. The closure member may have a first portion with a maximum cross section smaller than the cross section of the outlet, and a second portion with a cross section larger than the cross section of the outlet.

In some optional embodiments, elastic return means may be provided in order to return the dosing cavity into the first position when the pressure of the product on the first piston ceases. These return means, which can, among other things, comprise a helical spring, any other type of spring or any other elastic biasing member, may facilitate the operation of the assembly. For example, after the dispensing of one dose, the elastic return means might automatically prepare the assembly for the dispensing of a further dose.

In the case of a helical spring, a first end of the spring may bear against the closure member located outside the dosing cavity, and the other end of the spring may bear against an end wall of the dosing nozzle located opposite the second piston.

According to an optional embodiment, during the second phase of movement of the dosing cavity, the second piston may be immobilized in translation by a stop formed by the body. Such a stop may extend continuously over the entire inner surface of the dosing cavity, or only in a discontinuous manner.

In some optional embodiments, a closure member may be designed so as to allow air to be taken inside the container via the outlet or outlets of the dosing cavity when the dosing cavity returns from the second position to the first position.

A closure member may be designed so as to allow the intake of air inside the container via the outlet or outlets of the dosing cavity when the dosing cavity returns from the second position to the first position. Thus the intake of air may take place during the return of the dosing cavity into the first position, via the outlet or outlets of the dosing cavity, before said outlet or outlets has or have been closed by the closure member. Optionally, there might not be a separate circuit for the intake of air.

According to an optional embodiment, the product is dispensed via at least one dispensing hole traversing an end wall of the body of the dosing nozzle, arranged opposite to and at a distance from the second piston when the dosing cavity is in the second position. The end wall may be at a distance from the second piston such that, when the dosing cavity is in the second position, the closure member is at most level with the end wall of the dosing nozzle. Optionally, this type of arrangement may provide that no portion of the closure member emerges outside the device during the product dispensing, which may contribute to maintaining a satisfactorily attractive design of the device.

Optionally, a dispensing hole may be substantially in line with the outlet of the dosing cavity.

An additional option may include an elastically deformable membrane arranged in the dispensing hole. The membrane may include at least one slot, closed in the absence of pressure inside the dosing nozzle and capable of opening in response to a pressure exerted by the product exiting the outlet of the dosing cavity. The membrane may be glued, snap-fitted, welded, or otherwise fastened around the dispensing hole. Such a membrane may make it possible to keep the dispensing hole in a satisfactorily clean condition and allow the flow of product to be interrupted instantaneously.

Again, the degree of closure of the slot may depend to a large extent on the viscosity of the product. As a function of the viscosity of the product, the edges which delimit the slot may be more or less contiguous and sufficiently close to retain the product inside the dosing nozzle.

Optionally, the membrane may be capable, in response to pressure exerted by the product being expelled from the outlet of the dosing cavity, of occupying a convex profile facing towards the outside of the dosing nozzle and, due to a suction phenomenon when the dosing cavity returns from the second position to the first, of returning to a convex profile facing towards the inside of the container. During this return of the membrane towards the inside of the dosing nozzle, an intake of air towards the container may take place. This is because the return of the membrane may confer on the slot an orientation capable of allowing the intake of air inside the dosing nozzle and of preventing any inconvenient expulsion of product.

Such a membrane may be produced from a material chosen from thermoplastic or crosslinked elastomers, in particular silicones, natural or synthetic latexes, EPDMs, polyurethanes, mixtures of polypropylene and of SBS, SEBS or EPDM, very-low-density polyethylenes, mixtures based on polyester glycols (TPU) or polyether glycols (PEBA and COPE), and flexible polyvinyl chlorides (PVC).

According to a further optional aspect, an assembly may be provided for the packaging and dosed dispensing of a product (P), such as a cosmetic product. The assembly may comprise a container formed from a body having one end closed by a base, and another end forming a neck having a free edge delimiting an opening. A dosing nozzle may be fitted securely onto the neck. The container may have the form of a tube or of a bottle. The cross section of the container may be of any type, for example oval, elliptical or circular. A cap may be provided to removably cover the dosing nozzle, for example, in a storage position. The dosing nozzle may be mounted substantially parallel to and along the axis of the container. However, this is not a necessary characteristic. In certain cases, it may be desirable to fit the dosing nozzle at an angle with respect to the axis of the container, in order to enhance the rate of emptying of the container.

The body of the container may have one or more walls capable of being squashed when pressure is exerted on the container in a direction substantially perpendicular to the wall(s), and of returning to their initial shape when the pressure ceases.

Other means, for example a piston, could be envisaged for pressurizing the product with a view to forcing its expulsion through the dosing nozzle.

Such an assembly may be particularly suited to, but not limited to, the packaging and dosed dispensing of a cosmetic product, for example a shampoo, a conditioner, a hair gel, or a beauty-care cream or milk.

According to one aspect, a dosing nozzle for a container comprises a body and a first piston and a second piston configured to slide inside the body. The first and second pistons at least partially define a dosing cavity for selective communication with a container via at least one inlet. The cavity may be movable between a first position and a second position. At least one outlet for the dosing cavity, may be defined at least partially by the second piston and a closure member may be fixed to the first piston. The closure member may be moveable with respect to the second piston and be configured to selectively provide one of closing off and opening of the at least one outlet.

Another exemplary apparatus may comprise a body, movable first and second pistons provided in the body, the pistons at least partially defining a dosing cavity located between the first and second pistons, at least one outlet for passing product from the cavity, the at least one outlet being defined at least partially by the second piston, a valving member configured to provide valving of product flow through the at least one outlet, and at least one inlet for passing product into the cavity.

An additional example of an apparatus comprises a body, movable first and second pistons provided in the body, the pistons at least partially defining a dosing cavity located between the first and second pistons, at least one outlet for passing product from the cavity, a valving member configured to provide valving of product flow through the at least one outlet, at least one inlet for passing product into the cavity, and a biasing member for biasing at least one of the pistons.

An optional arrangement may include the at least one outlet substantially in a center part of the second piston. Optionally, the first piston, during a first phase of movement of the dosing cavity, is driven by the second piston through the effect of pressure of a product being exerted on the second piston and, during a second phase of movement of the dosing cavity, is driven by the pressure of the product being exerted on the first piston. The apparatus may be configured such that the second piston is immobilized in translation during the second phase and/or the closure member may be configured such that, when the dosing cavity returns from the second position to the first position, the first piston drives the second piston.

Additionally, the apparatus may further comprise elastic return means for returning the dosing cavity to the first position when the pressure of the product on the first piston ceases. The elastic return means could be a spring biasing at least one of the closure member, the first piston, and the second piston.

The at least one inlet may be delimited at least partly by the first piston. The apparatus may be configured such that the dosing cavity is in flow communication with the container during the first phase of movement and isolated from the container in the second phase of movement. Also possible is an apparatus configured such that the at least one outlet is closed during the first phase of movement and open during the second phase of movement. Some apparatuses of the invention may include a stop limiting translation of the second piston.

Some embodiments of the invention may include an element coupling together at least some movement of the first piston and the second piston. Optionally, the coupling element comprises the valving member. The valving member may be, but is not required to be, fixed to the first piston. The valving member may be configured to selectively close off and open the at least one outlet. The at least one inlet may at least partially defined by the nozzle/apparatus.

Another optional aspect of the invention includes a closure member configured to permit air to be taken inside the cavity and/or container via the at least one outlet.

In another aspect, the body may comprise an end wall having at least one dispensing hole through which the product can be dispensed. The at least one dispensing hole can be substantially aligned with the at least one outlet for the dosing cavity. When an end wall is present, the dosing cavity may be movable between a first position and a second position, and the end wall may be spaced at a distance from the second piston when the dosing cavity is in the second position.

An optional feature may include an elastically deformable membrane associated with the at least one dispensing hole. The membrane may comprise at least one slot configured to be closed in the absence of sufficient pressure inside the dosing nozzle and to open in response to pressure exerted by product exiting the at least one outlet of the dosing cavity. When equipped with such a membrane, the membrane may be configured such that pressure exerted by the product exiting the at least one outlet of the dosing cavity, changes the profile of the membrane between a convex profile facing towards an outside of the dosing nozzle or apparatus and a convex profile facing towards an inside of the nozzle or appratus. The membrane may be formed of a material chosen from, but not limited to: thermoplastic elastomers, crosslinked elastomers, silicones, natural latexes, synthetic latexes, EPDMs, polyurethanes, mixtures of polypropylene and SBS, SEBS or EPDM, very-low-density polyethylenes, mixtures based on polyester glycols (TPU) or polyether glycols (PEBA and COPE), and flexible polyvinyl chlorides (PVC).

Another aspect includes a dispensing device comprising a container and the dispensing nozzle or apparatus associated with the container. The dispensing device may comprise a container body having one end closed by a base and another end forming a neck with a free edge delimiting an opening, the dosing nozzle being fitted securely onto the neck. The container may include at least one wall capable of being squeezed when squeezing pressure is exerted on the container and of returning to an initial shape when the squeezing pressure ceases. Additionally, the dispensing device may include a cosmetic product contained in the container. For example, the product can be chosen from, but not limited to, a shampoo, a conditioner, a hair gel, a beauty-care cream and beauty-care milk.

Other aspects may include a method of dispensing and applying a cosmetic product. The method may comprise providing any one of the dispensing devices described herein, and dispensing cosmetic product from the device, wherein the dispensing comprises passing the cosmetic product through the at least one outlet and applying the cosmetic product to at least one of skin and hair.

An additional aspect may include a method of dosing a product. The method may comprise providing an apparatus comprising a cavity defined, at least in part, by first and second movable pistons, flowing a product from a reservoir into the cavity, moving the pistons in response to pressure of the product, closing at least one inlet providing product flow from the reservoir to the cavity, opening at least one outlet for the cavity, wherein the opening comprises moving a closure member in response to movement of the first piston, and passing the product from the cavity via the at least one outlet. The method may further include squeezing the reservoir to increase pressure of the product.

Aside from the structural and procedural arrangement set forth above, the invention could include a number of other arrangements, such as those explained hereinafter. It is to be understood that both the foregoing description and the following description are exemplary.

The accompanying drawings are included to provide a further understanding of certain aspects and are incorporated in and constitute a part of this specification. The drawings illustrate an optional embodiment and, together with the description, serve to explain certain principles.

In the drawings,

FIGS. 1A–1B illustrate a container equipped with a dosing nozzle according to an embodiment. In FIG. 1A, the container is in the rest position. In FIG. 1B, the container is in the dispensing position;

FIG. 2 shows an axial cross sectional view of an embodiment of the dosing nozzle of FIGS. 1A and 1B; and FIGS. 3A–3D illustrate different stages in the operation of the dispensing nozzle of FIG. 2.

Reference will now be made in detail to an optional embodiment of the invention, an example of which is illustrated in the drawings. Wherever possible, the same reference numerals are used in the drawings and specification to refer to the same parts.

The nozzle 1 represented in FIG. 2 comprises a sheathing skirt 50 and a catching skirt 2. The inner surface of the skirt comprises a bead 3 capable of interacting, by snap-clipping, with a corresponding bead 4 formed on the outer surface of the neck 5 of a container 6 (represented upside down), such as a bottle with deformable walls.

One end of the catching skirt 2 and sheathing skirt 50 is closed by a transverse wall 7 having a center dispensing hole 8. The dosing nozzle 1 also comprises a skirt 9, of axis X, concentric with the lateral skirt 2, with a diameter which is slightly smaller than the inner diameter of the neck 5 so as to be inserted in a close-fitting manner inside the neck. A sealing lip (not shown) may enhance the seal when the dosing nozzle 1 is fitted onto the container 6. The skirt 9 may principally comprise three distinct portions. The first portion 10 has a first end integral with the end wall 7 and a second end opposite the first one. The second end of the first portion 10 is connected to a first end of a second portion of the lateral skirt 9. The second portion 11 has an internal diameter which is greater than the internal diameter of the first portion 10 so that a shoulder 12 is formed between the first and second portions. The end of the second portion 11, opposite the shoulder 12, extends via a plurality of tabs 13, 14, 15, spaced in a uniform manner so as to delimit a plurality of notches right around the skirt 9. Each of these tabs 13, 14, 15 ends in a bead 16, 17, 18 facing towards the inside of the skirt 9 and forming a plurality of stops for a dosing cavity 20 mounted slideably inside the skirt 9, and described in more detail below. In the embodiment illustrated, the tabs 13, 14, 15, the portion 10 and the portion 11 each extend, respectively, over approximately one third of the axial height of the skirt 9.

The dosing cavity 20 comprises a first piston 21 having a peripheral edge capable of being guided by the tabs 13, 14, 15 and of sliding in a more or less sealed manner bearing against the inner surface of the portion 11 of the skirt 9. The skirt 9 forms a fixed body for the dosing nozzle. The clearance between the peripheral edge of the piston 21 and the inner surface of the portion 11 of the skirt 9 may depend on the viscosity of the product and of the comfort sought during dispensing. When the viscosity is greater, the clearance may be greater. The beads 16, 17, 18 ensure retention of the piston 21 inside the skirt 9. On the side of the piston 21 opposite the container 6, the piston is integral with a closure member 26 formed at the end of a linking element 23 having a cross section in the shape of a cross. The linking element 23 traverses an outlet 24 formed substantially in the centre of a second piston 25 having a peripheral edge also capable of sliding in a substantially sealed manner bearing against the inner surface of the portion 11 of the skirt 9. The maximum section of the closure member 26 is inscribed in a circle whose diameter is greater than the diameter of the circle in which the outlet 24 traversing the piston 25 is inscribed. The closure member 26 is mounted, for example, by snap-fitting over the free end of the linking element 23 and is arranged on that side of the piston 25 which faces towards the end wall 7.

Fitting of the pistons 21 and 25 inside the skirt 9 of the dosing nozzle 1 may be made possible by the elastic deformability of the tabs 13, 14, 15.

In the absence of sufficient pressure exerted by the product on the piston 25 and through the action of a return spring 40 arranged between the end wall 7 and the closure member 26, the closure member 26, and the first piston 21 to which it is secured via the linking element 2 (and also the second piston 25 to which the closure member 26 is coupled partially) are stressed in the direction away from the end wall 7 until the piston 21 abuts against the beads 16, 17, 18. In this position, the piston 25 is close to the upper end of the portion 11 of the skirt 9, the central hole 24 of the piston 25 being closed off in a sealed manner by the closure member 26. The piston 21 delimits, together with the tabs 13, 14, 15, a plurality of inlets 27, 28, 29 which, in this position of the piston 21, provide communication between the dosing cavity 20 and the inside of the container.

The maximum height of the inlets or holes 27, 28, 29 corresponds substantially to the height (under the beads 16, 17, 18) of the catching tabs 13, 14,15 less the thickness of the piston 21 and the height of its peripheral edge. Typically, this maximum height is of the order of a few millimetres. By way of example, the inlets have an axial height which is of the order of about 10 mm. The height of the linking element 23 corresponds substantially to the maximum height of the inlets 16, 17, so that, in the high position of the dosing cavity 20 (as shown in FIG. 2), the piston 25 is close to the upper end of the portion 11 of the skirt 9 and the outlet 24 opens substantially at the same time as the inlets 27, 28, 29 close.

The dosing cavity 20 can move axially between (a) a high position in which the first piston 21 bears against the beads 16, 17, 18 of the catching tabs 13, 14, 15, and in which the second piston 25 is close to the upper end of the portion 11 of the skirt 9—in this position, the inlets 27, 28, 29 of the dosing chamber are open to their maximum extent and the closure member 26 closes off the hole 24 traversing the piston 25; and (b) a low position in which the piston 25 bears against the shoulder 12 and first piston 21 bears against the second piston 25—in this position, the dosing cavity 20 has a minimum volume. Between these two extreme positions, the dosing cavity pass through a first "force-feeding" phase of the dosing cavity (FIG. 3B), in which the inlets 27, 28, 29 provide communication between the container 6 and the dosing cavity 20, as the latter progresses towards the end wall 7, the outlet 24 being closed off in a sealed manner by the closure member 26. This first phase continues until the piston 25 arrives to abut against the shoulder 12. A second "dispensing" phase (FIG. 3C) comes after the force-feeding phase. During this phase, the dosing cavity 20 is isolated from the container 6 by the piston 21, and the outlet 24 traversing the piston 25 is exposed. This phase continues until the piston 21 in turn abuts against an edge 30 formed around the outlet 24 traversing the piston 25.

The end wall 7 of the dosing nozzle 1 is at such a distance from the shoulder 12 that, in the low position of the dosing cavity 20 as described above, the piston 21 is able to abut against the edge 30 of the piston 25 so as to ensure complete emptying of the dosing cavity. In this position, the closure member is substantially level with the dispensing hole 8 traversing the end wall 7.

According to the embodiment illustrated, an elastomeric membrane 31 is arranged in the dispensing hole 8. Such a membrane may be glued, snap-fitted or welded right around the dispensing hole 8. The membrane 31 includes at least one slot 32, closed in the absence of pressure inside the dosing nozzle and capable of opening in response to a pressure exerted by the product being expelled from the outlet 24 of the dosing cavity 20.

Figure 3A:
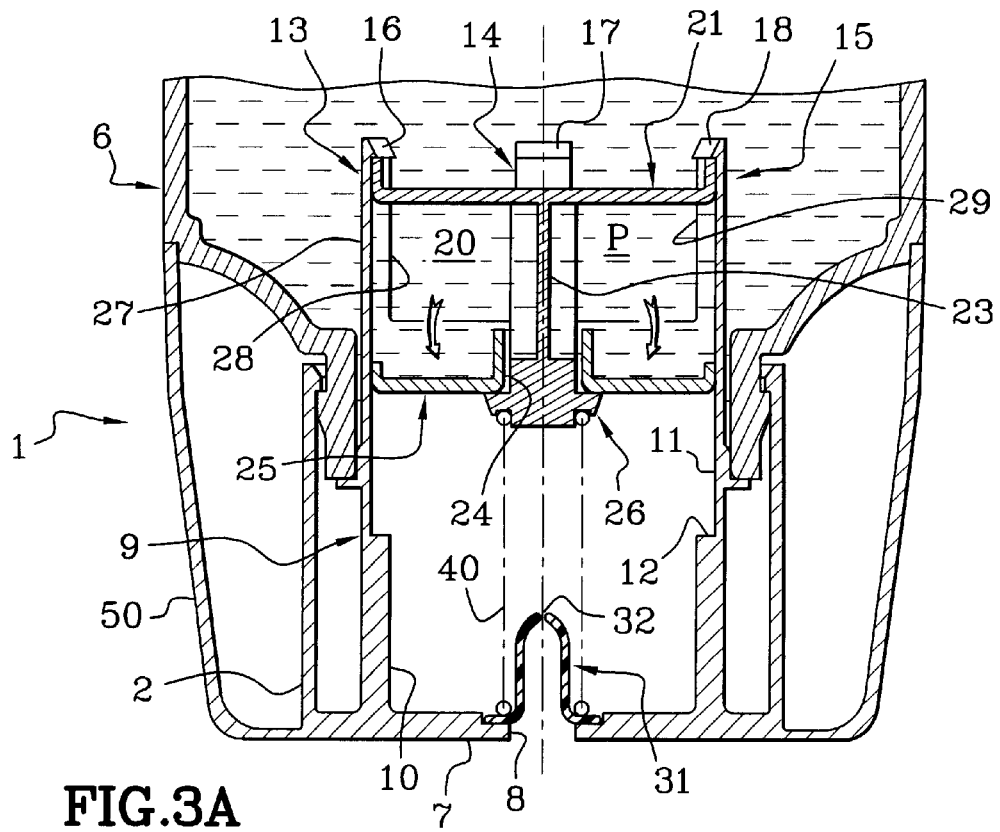
Figure 3B:
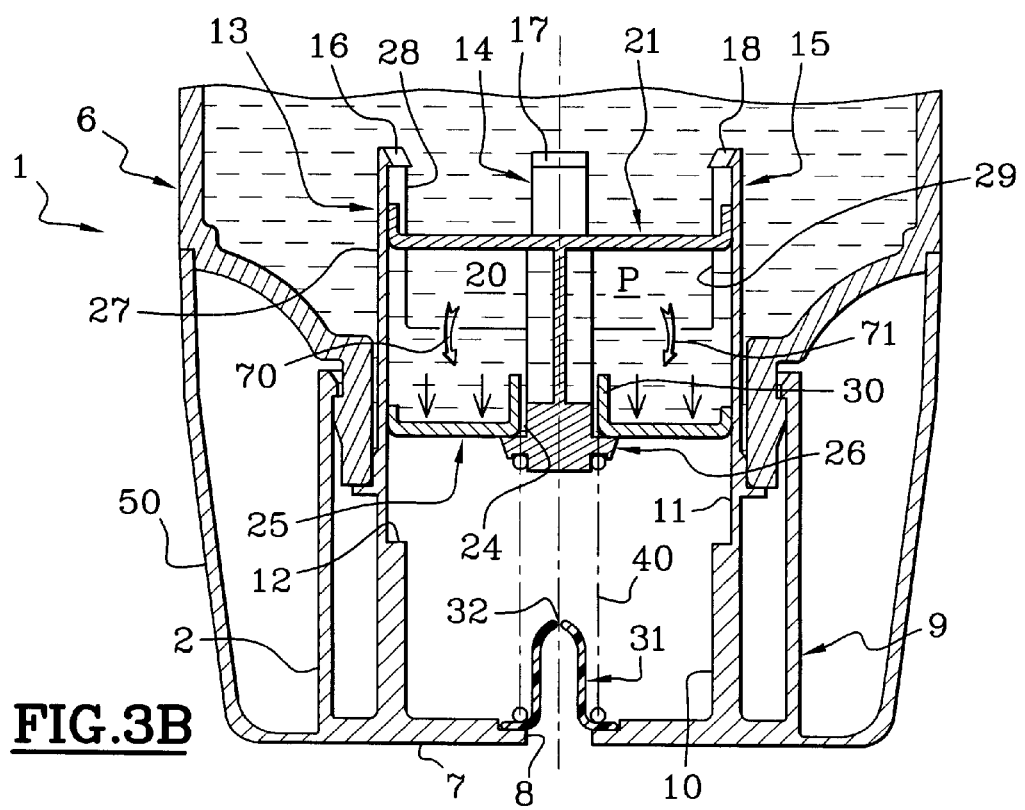
Figure 3C:
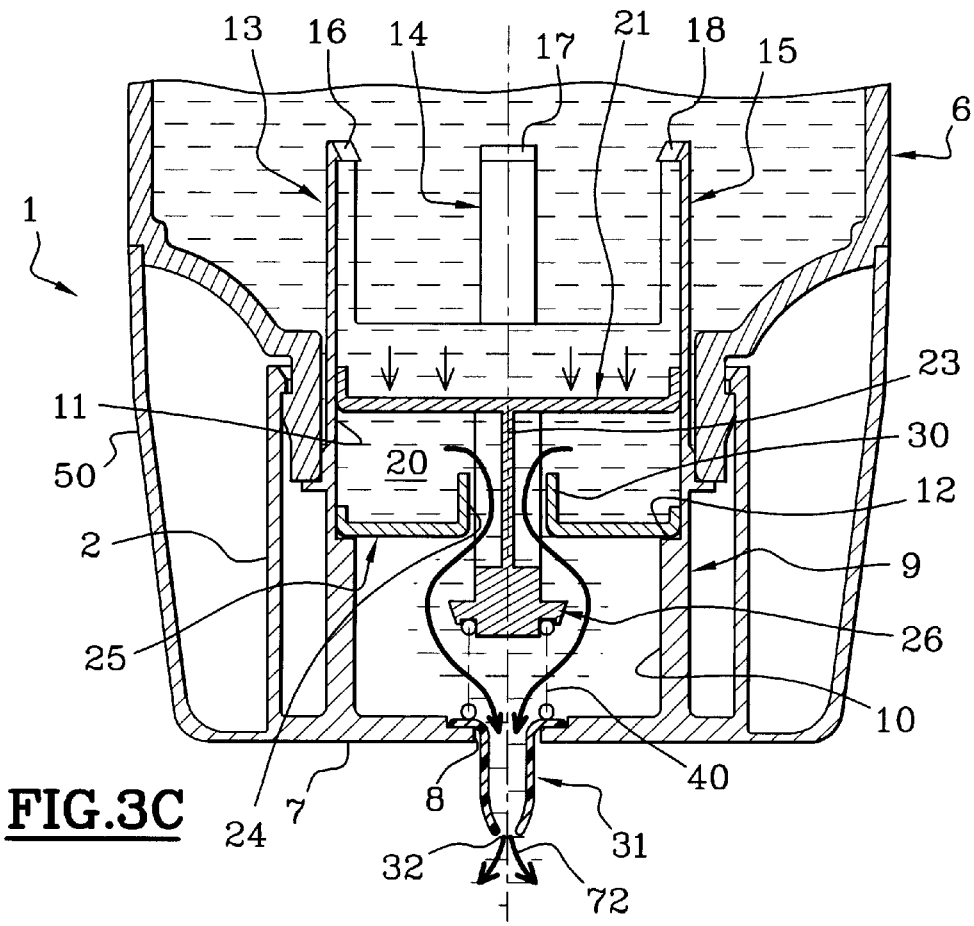

The membrane 31 is configured in such a manner that, in response to a pressure exerted by the product being expelled from the outlet 24 of the dosing cavity 20, it has a convex profile facing towards the outside of the dosing nozzle (see FIG. 3C). Due to a suction phenomenon when the dosing cavity 20 returns to the high position, and when the walls resume their non-deformed position, the membrane 31 returns to occupy a convex profile facing towards the inside of the container, as shown in FIG. 2.

As shown in FIGS. 1A and 1B, the assembly 100 on which the dosing nozzle 1 is mounted may comprise a bottle 6, for example made from polyethylene or polypropylene. The bottle 6 includes a body 61 closed by a base 62. The body has an elongate transverse section and is formed from two large faces 63, 64 which can be deformed "elastically" through the effect of a pressure F exerted, as illustrated in FIG. 1B, perpendicularly to the large sides of the bottle. In the dispensing position illustrated in FIG. 1B, in response to a pressure F exerted on the walls of the bottle, perpendicularly to the large faces thereof, the product P is dispensed in an essentially axial flow through the slot 32 provided in the membrane 31 arranged inside the dispensing hole 8 traversing the end wall 7. During dispensing, with the exception of the membrane 31, nothing emerges substantially beyond the end wall 7.

FIGS. 1A–1B and 3A–3D, to which reference is now made, illustrate the operation of the dosing nozzle described with reference to FIG. 2. In the rest position (as described with reference to FIG. 3A), the container 6 is preferably placed upside down on a flat surface. In this position, the expulsion passage 24 of the dosing cavity 20 is closed off by the closure member 26. The piston 21, urged by the spring 40, abuts against the beads 16, 17, 18 of the catching tabs 13, 14, 15. The inlets 27, 28, 29 are exposed so that the dosing cavity 20 is in communication with the container, the product P occupying the entire volume formed around the linking element 23 between the pistons 21 and 25. The piston 25 is close to the upper end of the portion 11 of the axial skirt 9 such that the volume located between the piston 25 and the end wall 7 is isolated from the container 6. This rest position corresponds to the position shown in FIG. 1A.

As shown in FIG. 3B, pressure is exerted on the lateral walls of the container, the container 7 now being held upside down with one hand. The product P located between the two pistons, and thus pressurized, exerts a pressure on the piston 25 and gives rise to the movement of the latter towards the end wall 7. The flows of product during this first phase are illustrated by the arrows 70 and 71. During this phase, the outlet 24 traversing the piston 25 is closed off by the closure member 26. The axial height of the inlets providing communication between the container 6 and the dosing cavity 20 progressively diminishes until it becomes substantially zero when the piston 25 arrives to abut against the shoulder 12. At this point, the dosing cavity 20 is full and isolated from the container 6.

When the piston 25 abuts against the shoulder 12 and the dosing cavity 20 is isolated from the container 6 by the piston 21, the pressurized product contained in the container then entrains the piston 21 towards the end wall 7 of the dosing nozzle 1. During this time, the closure member 26 detaches from the piston 25, thus allowing the passage of the product between the inner edge, delimiting the outlet 24 traversing the piston 25, and the linking element 23 whose cross section is in the form of a cross. The pressurized product then gives rise to the return of the membrane 31 towards the outside of the dosing nozzle and, as illustrated in FIG. 3C, expulsion of the product in a localized manner (arrow 72) via the slot 32 traversing the membrane 31. This phase of dispensing of the product continues until the piston 21 abuts against the edge 30 of the piston 25. At this point, the dosing cavity is completely empty except for the volume located below the edge 30, which volume may be made as small as possible by suitably choosing the configuration of the pistons 21, 25 and of the edge 30.

Figure 3D:
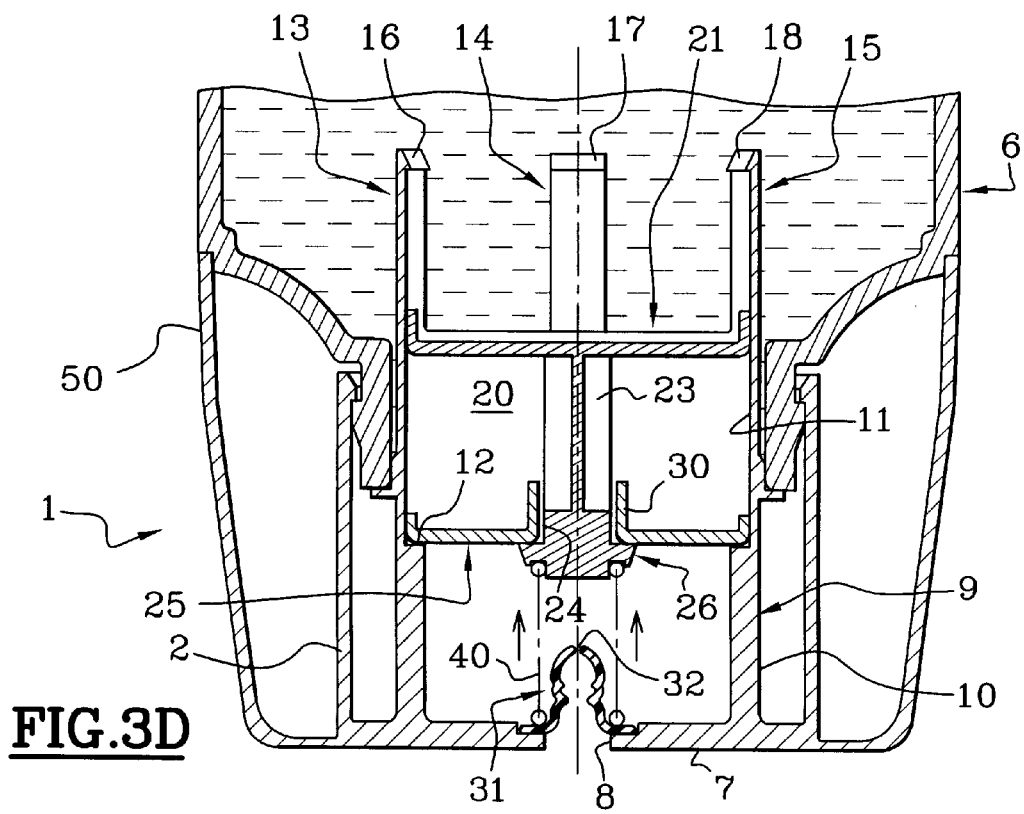

In FIG. 3D, after having relaxed the pressure exerted on the walls 63, 64 of the bottle, the walls return to their initial position. The closure member 26, through the action of the return force of the spring 40, urges the piston 21 and the piston 25 in the direction away from the end wall 7. The reduced pressure which results from this inside the volume located under the piston 25 gives rise to the return of the membrane 31 towards the inside of the dosing nozzle 1 and an air intake via the slot or slots 32 which traverse it. The air also enters into the dosing cavity 20 before the outlet 24 traversing the piston 25 is closed off, which makes it possible to offset, inside the container 6, the volume of product dispensed. When the piston 21 abuts against the beads 16,17, 18, the movement of the dosing cavity stops. The device is ready for a further use.

It will be apparent to those skilled in the art that various modifications and variations can be made to the structure and methodology of the present invention. Thus, it should be understood that the invention is not limited to the embodiments and examples discussed in the specification. Rather, the present invention is intended to cover modifications and variations.

What is claimed is:

1. A dosing nozzle for a container, comprising:
   a body;
   a first piston and a second piston configured to slide inside the body, the first and second pistons at least partially defining a dosing cavity for selective communication with a container via at least one inlet, said cavity being movable between a first position and a second position;
   at least one outlet for the dosing cavity, the at least one outlet being defined at least partially by the second piston; and
   a closure member fixed to the first piston, the closure member being moveable with respect to the second piston and being configured to selectively provide one of closing off and opening of the at least one outlet.

2. The dosing nozzle of claim 1, wherein the nozzle is configured such that the first piston, during a first phase of movement of the dosing cavity, is driven by the second piston through the effect of pressure of a product being exerted on the second piston and, during a second phase of movement of the dosing cavity, is driven by the pressure of the product being exerted on the first piston.

3. The dosing nozzle of claim 2, wherein the nozzle is configured such that the second piston is immobilized in translation during the second phase.

4. The dosing nozzle of claim 2, wherein the closure member is configured such that, when the dosing cavity returns from the second position to the first position, the first piston drives the second piston.

5. The dosing nozzle of claim 2, further comprising:
   elastic return means for returning the dosing cavity to the first position when the pressure of the product on the first piston ceases.

6. The dosing nozzle of claim 1, further comprising a spring biasing at least one of the closure member, the first piston, and the second piston.

7. The dosing nozzle of claim 1, wherein the at least one inlet is delimited at least partly by the first piston.

8. The dosing nozzle of claim 2, wherein the nozzle is configured such that the dosing cavity is in flow communication with the container during the first phase of movement and isolated from the container in the second phase of movement.

9. The dosing nozzle of claim 2, wherein the nozzle is configured such that the at least one outlet is closed during the first phase of movement and open during the second phase of movement.

10. The dosing nozzle of claim 1, further comprising a stop limiting translation of the second piston.

11. The dosing nozzle of claim 1, wherein the closure member is configured to permit air to be taken inside the container via the at least one outlet.

12. The dosing nozzle of claim 1, wherein the body comprises an end wall having at least one dispensing hole through which the product is dispensed.

13. The dosing nozzle of claim 12, wherein the at least one dispensing hole is substantially aligned with the at least one outlet for the dosing cavity.

14. The dosing nozzle of claim 12, wherein the dosing cavity is movable i between a first position and a second position, and wherein the end wall is spaced at a distance from the second piston when the dosing cavity is in the second position.

15. The dosing nozzle of claim 12, further comprising:
   an elastically deformable membrane associated with the at least one dispensing hole, the membrane comprising at least one slot configured to be closed in the absence of sufficient pressure inside the dosing nozzle and to open in response to pressure exerted by product exiting the at least one outlet of the dosing cavity.

16. The dosing nozzle of claim 15, wherein the membrane is configured such that pressure exerted by the product exiting the at least one outlet of the dosing cavity, changes the profile of the membrane between a convex profile facing towards an outside of the dosing nozzle and a convex profile facing towards an inside of the nozzle.

17. The dosing nozzle of claim 15, wherein the membrane is formed of a material chosen from: thermoplastic elastomers, crosslinked elastomers, silicones, natural latexes, synthetic latexes, EPDMs, polyurethanes, mixtures of polypropylene and SBS, SEBS or EPDM, very-low-density polyethylenes, mixtures based on polyester glycols (TPU) or polyether glycols (PEBA and COPE), and flexible polyvinyl chlorides (PVC).

18. A dispensing device comprising:
   a container; and
   the dispensing nozzle of claim 1 associated with the container.

19. The dispensing device of claim 18, wherein the container comprises a container body having one end closed by a base and another end forming a neck with a free edge delimiting an opening, the dosing nozzle being fitted securely onto the neck.

20. The dispensing device of claim 18, wherein the container comprises at least one wall capable of being squeezed when squeezing pressure is exerted on the container and of returning to an initial shape when the squeezing pressure ceases.

21. The dispensing device of claim 18, further comprising a cosmetic product contained in the container.

22. The dispensing device of claim 21, wherein the product is chosen from: a shampoo, a conditioner, a hair gel, a beauty-care cream and beauty-care milk.

23. A method of dispensing and applying a cosmetic product, comprising:
   providing the dispensing device of claim 21;
   dispensing cosmetic product from the device, wherein the dispensing comprises passing the cosmetic product through the at least one outlet; and
   applying the cosmetic product to at least one of skin and hair.

24. An apparatus for dosing a product, comprising:
   a body;
   movable first and second pistons provided in the body, the pistons at least partially defining a dosing cavity located between the first and second pistons;
   at least one outlet for passing product from the cavity, the at least one outlet being defined at least partially by the second piston;

a valving member configured to provide valving of product flow through the at least one outlet; and at least one inlet for passing product into the cavity.

25. The apparatus of claim 24, wherein the at least one outlet is substantially in a center part of the second piston.

26. The apparatus of claim 24, wherein the body further comprises an end wall having at least one dispensing hole through which the product is dispensed.

27. The apparatus of claim 26, wherein the at least one outlet and the at least one dispensing hole are substantially aligned.

28. The apparatus of claim 26, further comprising an elastically deformable membrane associated with the at least one dispensing hole, the membrane comprising at least one slot configured to be closed in the absence of sufficient pressure inside the body and to open in response to pressure exerted by product exiting the at least one outlet of the dosing cavity.

29. The apparatus of claim 28, wherein the membrane is configured such that pressure exerted by the product exiting the at least one outlet of the dosing cavity changes the profile of the membrane between a convex profile facing towards an outside of the body and a convex profile facing towards an inside of the body.

30. The apparatus of claim 24, wherein the apparatus is configured to permit air to be taken inside the cavity via the at least one outlet.

31. The apparatus of claim 24, further comprising:

an element coupling together at least some movement of the first piston and the second piston.

32. The apparatus of claim 31, wherein the element comprises the valving member.

33. The apparatus of claim 24, wherein the valving member is fixed to the first piston.

34. The apparatus of claim 24, wherein the valving member is configured to selectively close off and open the at least one outlet.

35. The apparatus of claim 24, wherein the at least one inlet is at least partially defined by the body.

36. A dispensing device comprising:

a container; and the apparatus of claim 24 associated with the container.

37. The dispensing device of claim 36, wherein the container comprises a container body having one end closed by a base and another end forming a neck with a free edge delimiting an opening, the dosing nozzle being fitted securely onto the neck.

38. The dispensing device of claim 36, wherein the container comprises at least one wall capable of being squeezed when squeezing pressure is exerted on the container and of returning to an initial shape when the squeezing pressure ceases.

39. The dispensing device of claim 36, further comprising a cosmetic product contained in the container.

40. The dispensing device of claim 39, wherein the product is chosen from: a shampoo, a conditioner, a hair gel, a beauty-care cream and beauty-care milk.

41. A method of dispensing and applying a cosmetic product, comprising:

providing the dispensing device of claim 39;

dispensing cosmetic product from the device, wherein the dispensing comprises passing the cosmetic product through the at least one outlet; and applying the cosmetic product to at least one of skin and hair.

42. An apparatus for dosing a product, comprising:

a body;

movable first and second pistons provided in the body, the pistons at least partially defining a dosing cavity located between the first and second pistons;

at least one outlet for passing product from the cavity;

a valving member configured to provide valving of product flow through the at least one outlet;

at least one inlet for passing product into the cavity; and a biasing member for biasing at least one of the pistons.

43. The apparatus of claim 42, wherein the at least one outlet is substantially in a center portion of the second piston.

44. The apparatus of claim 42, wherein the biasing member comprises a spring.

45. The apparatus of claim 42, wherein the body further comprises an end wall having at least one dispensing hole through which the product is dispensed.

46. The apparatus of claim 45, wherein the at least one outlet to the cavity and the at least one dispensing hole are substantially aligned.

47. The apparatus of claim 45, further comprising an elastically deformable membrane associated with the at least one dispensing hole, the membrane comprising at least one slot configured to be closed in the absence of sufficient pressure inside the body and to open in response to pressure exerted by product exiting the at least one outlet of the dosing cavity.

48. The apparatus of claim 47, wherein the membrane is configured such that pressure exerted by the product exiting the at least one outlet of the dosing cavity changes the profile of the membrane between a convex profile facing towards an outside of the body and a convex profile facing towards an inside of the body.

49. The apparatus of claim 42, wherein the apparatus is configured to permit air to be taken inside the cavity via the at least one outlet.

50. The apparatus of claim 42, further comprising:

an element coupling together at least some movement of the first piston and the second piston.

51. The apparatus of claim 50, wherein the element comprises the valving member.

52. The apparatus of claim 42, wherein the valving member is fixed to the first piston.

53. The apparatus of claim 42, wherein the valving member is configured to selectively close off and open the at least one outlet.

54. The apparatus of claim 42, wherein the at least one inlet is at least partially defined by the body.

55. A dispensing device comprising:

a container; and the apparatus of claim 42 associated with the container.

56. The dispensing device of claim 55, wherein the container comprises a container body having one end closed by a base and another end forming a neck with a free edge delimiting an opening, the dosing nozzle being fitted securely onto the neck.

57. The dispensing device of claim 55, wherein the container comprises at least one wall capable of being squeezed when squeezing pressure is exerted on the container and of returning to an initial shape when the squeezing pressure ceases.

58. The dispensing device of claim 55, further comprising a cosmetic product contained in the container.

59. The dispensing device of claim 58, wherein the product is chosen from: a shampoo, a conditioner, a hair gel, a beauty-care cream and beauty-care milk.

60. A method of dispensing and applying a cosmetic product, comprising:

providing the dispensing device of claim 58;

dispensing cosmetic product from the device, wherein the dispensing comprises passing the cosmetic product through the at least one outlet; and applying the cosmetic product to at least one of skin and hair.

61. A method of dosing a product, comprising:

providing an apparatus comprising a cavity defined, at least in part, by first and second movable pistons;

flowing a product from a reservoir into the cavity;

moving the pistons in response to pressure of the product;

closing at least one inlet providing product flow from the reservoir to the cavity;

opening at least one outlet for the cavity, wherein the opening comprises moving a closure member in response to movement of the first piston; and passing the product from the cavity via the at least one outlet.

62. The method of claim 61, further comprising squeezing the reservoir to increase pressure of the product.

* * * * *

UNITED STATES PATENT AND TRADEMARK OFFICE
CERTIFICATE OF CORRECTION

PATENT NO. : 6,484,906 B2  
DATED : November 26, 2002  
INVENTOR(S) : Philippe Bonningue It is certified that error appears in the above-identified patent and that said Letters Patent is hereby corrected as shown below:

<u>Title page,</u>  
Item [57], ABSTRACT,  
Line 10, please delete "through".

<u>Column 12,</u>  
Line 5, please replace "movable i between" with -- movable between --.

Signed and Sealed this

Eighth Day of April, 2003

JAMES E. ROGAN  
*Director of the United States Patent and Trademark Office*